(12) United States Patent
Lempp et al.

(10) Patent No.: US 7,711,188 B2
(45) Date of Patent: May 4, 2010

(54) METHOD AND APPARATUS FOR IMAGE PROCESSING

(75) Inventors: Wolfgang Lempp, London (GB); James Logie, Woking (GB); Mark Wolforth, Ontario (CA)

(73) Assignee: Filmlight Limited

( * ) Notice: Subject to any disclaimer, the term of this patent is extended or adjusted under 35 U.S.C. 154(b) by 1018 days.

(21) Appl. No.: 11/402,747

(22) Filed: Apr. 12, 2006

(65) Prior Publication Data

US 2006/0262137 A1 Nov. 23, 2006

(30) Foreign Application Priority Data

Apr. 15, 2005 (GB) .................................. 0507608.8

(51) Int. Cl.
*G06K 9/34* (2006.01)
(52) U.S. Cl. ........................ 382/173; 382/305; 382/306

(58) Field of Classification Search ................. 382/305, 382/306, 173, 162, 167; 358/573, 520; 345/594, 345/619; 711/206, 207, 151, 167, 152; 355/38; 375/240.17, 240.12; 715/819, 723; 348/E5.002, 348/E5.006
See application file for complete search history.

(56) References Cited

U.S. PATENT DOCUMENTS

| 6,385,708 | B1 * | 5/2002 | Stracovsky et al. ......... 711/167 |
| 6,859,867 | B1 * | 2/2005 | Berry ......................... 711/206 |
| 2002/0057844 | A1 | 5/2002 | Sirohey et al. |

FOREIGN PATENT DOCUMENTS

| WO | WO 03/007605 | 1/2003 |
| WO | WO 03/034335 | 4/2003 |

* cited by examiner

*Primary Examiner*—Anh Hong Do
(74) *Attorney, Agent, or Firm*—Robert C. Klinger

(57) ABSTRACT

The present application relates to a method of processing data corresponding to an image (42; 52; 68; 70; 78, 80; 98). The method includes the step of generating an identifier (56, 58, 60, 62; 74, 76; 83, 84; 91, 92, 93) for identifying a region of the image (42; 52; 68; 70; 78, 80; 98) to which a block of said data relates; and then storing the identifier (56, 58, 60, 62; 74, 76; 83, 84; 91, 92, 93). The application further relates to apparatus for processing data corresponding to an image (42; 52; 68; 70; 78, 80; 98).

45 Claims, 13 Drawing Sheets

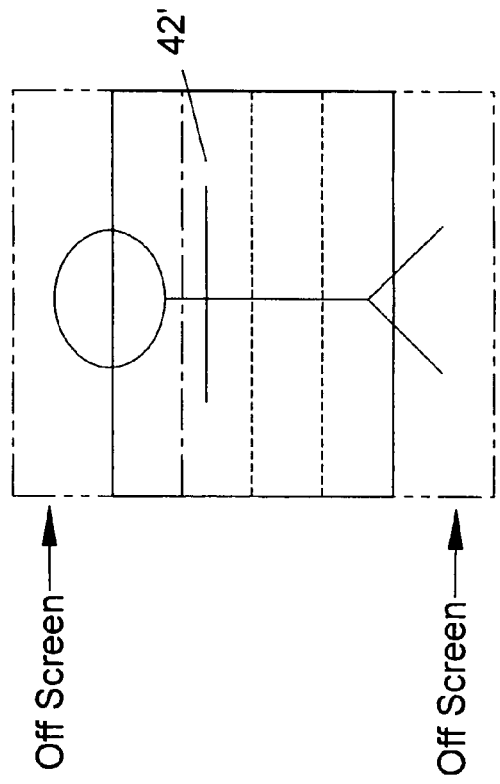
Figure 7b
Figure 7c
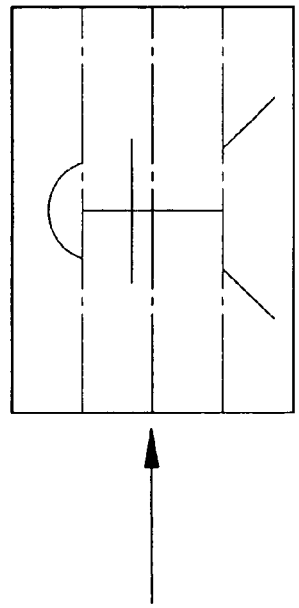
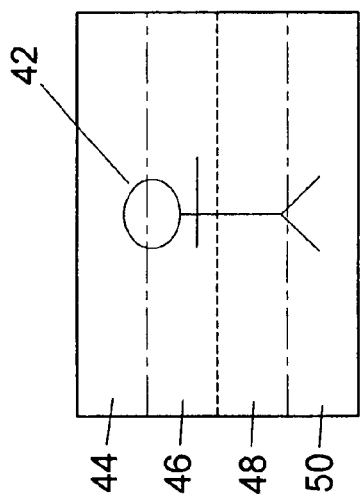
Figure 7a

Before Zoom  After Zoom

METHOD AND APPARATUS FOR IMAGE PROCESSING

FIELD OF THE INVENTION

The present application relates to a method of processing data and a system for processing data. The data typically corresponds to an image.

BACKGROUND OF THE INVENTION

There are many cases with image data where it is desirable to combine or segment images. These may include the segmentation of images into several or many 'tiles', for processing of each image, or the combination of several source images together on one display. There are even cases where it is desirable to segment very large images, process parts of the image through separate processing platforms, and to either combine them into a displayable stream for display on one very high resolution display, or to drive many physically adjacent displays that give the illusion of being one display. This application relates to the combining, segmentation, and separate processing of sections of these images.

Consider first the process of producing finished cinematographic works (films). For the first Eighty years in the history of film production, all work in editing, special effects, and compositing was done optically. This involved manually cutting film, and optically printing from one or more pieces of film onto a new film stock.

Approximately twenty years ago, it was demonstrated that the film as exposed in a film camera could be digitised in a frame by frame basis, and the result of this digitisation stored in digital storage media (such as magnetic computer discs). This data could then be processed by use of a digital computer, and a new digital image created from the first. Typical effects to be performed on the digital image may be to increase or decrease the brightness of a scene, or to alter one colour of the image differentially to other colours of that image. Other effects include the combination of two or more different images into one composite scene (this process is referred to as compositing). The resulting digital images may be shot back to film, using a film recorder. Thus this process has created a finished film from imperfect elements. This process is now common, and is referred to as 'Digital Intermediate', as the intermediate results only occur in the digital domain.

It will be appreciated that it is now possible to film digitally, avoiding the need to perform a separate step of digitising the images. Equally, a digital projector may display the digital images directly, thereby removing the need to transfer the digital images back to film.

The images and/or graphics are typically stored as a 2-Dimensional Matrix of Digital values, as illustrated in FIG. 1. To display images in this form, it is usual to have a Digital frame store 1, input means 2, and an image display means 3. It is usual in this arrangement to have a Digital-to-Analogue converter 4 which converts the digital stored values into equivalent analogue values for driving display means such as a cathode ray tube display.

The processing of digital images takes place in a variety of systems. Since a complete movie may be represented digitally by many Terabytes of data, significant computational resources are required to perform the necessary processing in a cost effective manner. Dedicated hardware systems such as the 'iQ' are available from the UK organisation Quantel Ltd., based in Newbury, Berkshire, UK. The dedicated hardware offers the necessary high speed performance, but has little flexibility for the addition of new features. Also, because the market for such systems is relatively very small compared with general purpose computers such as Personal Computers (PCs), the cost is relatively high. Thus there are several alternative systems available that use a general purpose PC. One such system is the 'Lustre' system from the Canadian company Discreet Logic. These systems have a lower cost, as the hardware is a mass commodity PC. However, since PCs are built for a wide variety of purposes, such systems do not perform optimally with very large quantities of data as is found in digitised film.

However, since PCs are built for a wide variety of purposes, such systems do not perform optimally with very large quantities of data as is found in digitised film. Thus the operator of such systems often has to wait whilst the system implements his required changes. This means that interactive response, where the operator alters a variable control, and wants to see interactively how much change is made whilst he alters the control cannot happen. This results in a great amount of frustration and lost productivity.

The Applicant has recognized that systems containing a number of industry standard PC computers to process different parts of the same film frame can be extremely useful. At least in preferred embodiments, these systems can result in much greater efficiency and provide real-time response in nearly all circumstances.

One problem occurs where it is necessary to show the changes made by each computer in combination, to show a desired change on the whole image. Whilst it would be quite usual in a multi PC architecture for each PC to write into part of a frame buffer, and to assemble the combined image in that buffer, for display to a display device such as a Monitor or projector, in practice this frame store would be expensive and cumbersome. Further disadvantages of using a frame store include the added delay that this causes. Thus frames viewed are yet another frame later than the operator's controls. Thus by the time the operator sees a frame, the computer is already handling frames that are ahead of this displayed frame. This lag makes the Human computer interaction difficult. The Applicant's co-pending UK patent application GB 0414897.9 filed on 2 Jul. 2004 teaches how problems such as these may be overcome using standard PC graphics cards, incorporating a simple modification to synchronise the output of the graphics cards, together with a low cost combiner card for combining the images from the graphics cards.

There are two principal classes of visual operation that are desirable in an image workstation. Firstly there are the manipulations that are performed on the data. Such operations include the lightening or darkening of an image, or part of an image. Other changes of this class may include the altering of the hue, saturation, or 'green-ness' of an image. A third example in this class may be to improve the sharpness of the image or part of the image. The defining factor of this class of change is that it is desired to change the look of the image or images for output. In other words, these are the changes that form part of the purpose and function of the 'Digital Intermediate' workflow.

A second class of function exists, where the function is only for display. One such function may be to make the image larger, so that a cut-out of a feature to be guided by the operator can be performed more easily. In this case, the enlargement is for the convenience of the operator to work on the image—there is no desire to make the output image larger. In another similar mode in this class, it may be desirable to compare two images. In digital film post production, it is often desirable to make changes on an image, whilst comparing the original (unchanged) image with the image that is being changed. This is often necessary to show how great or small a change has been made, as it is extremely difficult for the operator to remember precisely details of the original image, such as colour. FIG. 2 shows the monitor display that is desirable for the operator to perceive differences between two images. A first image 5 is displayed on the left hand side and a second image 7 is displayed on the right hand side. The second image 7 is the modified version of the first image 5. This class of display operation is intended to make the operator's job easier, and not intended to change the final film output to show both images. Putting it another way, this class of operation is intended to indirectly enable the operator to use the first class of operation to perform Digital Intermediate functions.

Some operations, such as a resize, can come into either class of operation. In the first class, it is desired to permanently change the size of the output image, to frame the material in a different way. In the second, it is desired not to change the output image, but to merely display it larger, so that the operator can see an area of the picture in greater detail.

To meet this need, it is desirable in the system described in the Applicant's co-pending application GB 0414897.9 to write onto the overall composite monitor space two different images. Thus it is necessary to allow the image combiner, described in the Applicant's co-pending application, to enable the display of two different images, rather than the display of different parts of the same image. This basically extends the concept introduced in GB 0414897.9 to allow display of a composite image from multiple graphics cards, without needing a frame buffer. The extensions consist of methods of using these same building blocks to display more complex image fields that meet the needs of post production, but by techniques that still do not necessitate a complex and expensive frame buffer.

There are a range of further processing techniques commonly employed when handling digital images. For example, there are many cases where it is desirable to segment images and display a number of these segments simultaneously, often but not limited to 'video Wall' displays. These are often the preferred image display means to overcome the physical limitations in display technologies such as flat panel displays and cathode ray tube displays. FIG. 3 illustrates an arrangement whereby six display panels 9, arranged in a 3×2 array, are used to display a large image at a size that it is not possible for any one display to be physically used. In this architecture it is necessary to segment an image into tiles, each of which is individually loaded into a digital frame store for that tile, and each tile is individually displayed. It is only the physical proximity of the display panels that creates the illusion of one image being displayed.

A system 11 for splitting an image into six tiles for display on a video wall is shown schematically in FIG. 4. The system 11 comprises an image disc store 13 and an image splitter 15 for splitting the image data into six separate blocks of data corresponding to the image tiles. The blocks of data are supplied to respective frame stores FS1 to FS6 and the image tiles displayed on corresponding screens 17, 19, 21, 23, 25, 27.

For many years there have existed a class of device for professional use known as 'Video Switchers'. These devices have the properties of being able to switch between multiple streams of video information. These devices have further capabilities of being able to take various parts of several images and create a composite image. These devices are also referred to as DVE (Digital Video Effects) systems. These have been manufactured and sold for many years by companies such as PINNACLE Systems, based in Mountain View, Calif., USA. Typical usage of such systems is to provide dynamic transitions between image sequences, where the first image wipes into a second, or where the first image undergoes a 'page turn' to reveal the second image on the 'reverse side' of that image.

SUMMARY OF THE INVENTION

At least in preferred embodiments, the present application relates to methods and systems for processing image data to provide at least some of the functionality described above.

Viewed from a first aspect, the present application relates to a method of processing data corresponding to an image, the method comprising the steps of: (a) generating an identifier for identifying a region of the image to which a block of said data relates; and (b) storing said identifier. Since an identifier is generated it is possible subsequently to determine which blocks of data relate to a particular region of the image. This identifier may be used to contain identification or control data. Alternatively, the identifier may contain a pointer to control data or other metadata. The blocks of data may subsequently be accessed to perform processing on some or all of the data contained therein to modify that part of the image. The identifier may be stored in a memory (for example in a graphics card) or by writing the identifier to a data storage device such as a hard disc. There are preferably provided a plurality of blocks of data each relating to a different part of the image. The method preferably comprises repeating steps (a) and (b) for each of the plurality of blocks of data to facilitate identification of the data corresponding to any part of the image.

The identifier may identify the vertical position of the region of said image to which the block of data relates. The identifier may thereby enable data for different images to be displayed one above the other, for example. The identifier may identify the horizontal position of the region of said image to which the block of data relates. It may also be desirable to use the identifier to provide information relating to both the horizontal and vertical position of the region of said image to which the block of data relates.

The identifier may alternatively identify the transition from said image to a separate image. Thus, the identifier may be utilised to facilitate the display of a plurality of images simultaneously. One of the images may, for example, overlay the other image. Alternatively, the images may be displayed side-by-side.

The block of data may correspond to a rectangular portion of the image, or to a horizontal or vertical band. Alternatively, the block of data may correspond to a line of the image, or to a part of a line of the image.

The identifier may be stored by writing it to said block of data. The identifier may overwrite data corresponding to one or more pixels of the image. Preferably, the identifier is written to the block of data and overwrites data corresponding to one or more pixels located at an edge of the image. This ensures that the user is not distracted by erroneous pixels throughout the image, rather they may all be provided along an edge thereof.

Typically this identifier will be embedded in the image content. Image data is such that if one or more pixels are not displayed, but used to store embedded control information, no visual differences are noted in practice. Preferably, this control information is stored on a 'line by line' basis, with each line having control information embedded at the start of that line.

The identifier for each block of data may consist of control information for enabling part, or all, of the associated block of data to be displayed. Preferably the control information is embedded with each block of data. Preferably, each block of data corresponds to one line of the image. Most preferably, the control information is embedded in the block of data at the start of each line of the image. It is often desirable to process image data on a 'line by line' basis. A well known mechanism for achieving the processing is the Field Programmable Gate Array (FPGA). Such devices are available from Xilinx, of San Jose, Calif., USA. Typical devices are the Virtex-4 LX200 devices which provide 200,448 logic cells. FPGAs contain typically enough memory for the storage of one or more lines of image data, but nowhere near enough storage for whole (or even part) images. These are reasons why the embedding of data at the start of lines is currently the preferred method.

The method may further comprise the step of re-setting the identifier to a predetermined value prior to displaying the image. The pixels corresponding to the data overwritten by the identifiers will then all be displayed in a predetermined colour (as determined by the value to which the data is set). For example, the data may be set to zero and the pixels will appear black when they are displayed. The display of these pixels in a predetermined colour is less distracting to the user.

Rather than overwriting data corresponding to the image, the block of data and the identifier may be stored together. This may be achieved by reading the block of data and allocating an additional space (of one or more bytes of data) in which the identifier may be stored. For example, the block of data may be read to a data store of size equal to or larger than the combined size of the block of data and the required identifier. The identifier may be stored in the data store along with the block of data without overwriting any of the data corresponding to the image. The identifier may subsequently be removed from the data store, for example by re-setting the size of the data store equal to that of the block of the data.

The identifier and the block of data may be stored in memory or they may be written to a data storage device, such as a hard disc.

Prior to displaying the image, the method may comprise the step of selecting only the data relating to said image for display. For example, if data relating to the identifier is stored in the first byte of a data store, the first byte of data is not selected when the image is to be displayed. Thus, data relating to the identifier is not displayed.

Although the image may be a complete image, for example a picture or a frame of a film, the image may in itself only be a part of a larger composite image made up of a plurality of images. Where the image is part of a composite image, the process may be repeated for each image forming the composite image. In certain circumstances, for example the processing of a film, it may be desirable to use a plurality of processors to process the composite image. Preferably, a dedicated processor is provided to perform the processing of each image forming the composite image. The composite image may be a frame of a film.

Viewed from a further aspect, the present application relates to a method of processing data corresponding to an image, the method comprising processing a block of said data and generating an identifier for identifying a region of the image to which the data block relates. The method preferably comprises writing the identifier to the data block. The method may further comprise the step of selecting and displaying only data in the data block relating to said image.

It must be understood that this identification of control data is of a transient nature. There is no 'meaning' to this data in an archival sense. It exists merely to control the displayed information at that moment in time.

Viewed from a further aspect, the present application relates to a method of processing data corresponding to an image, the method comprising the steps of: (a) dividing the data into segments, each segment corresponding to a part of said image; (b) subdividing the segments of data into a plurality of blocks of data; and (c) generating an identifier for identifying a region of the image to which each block of data relates. This method is particularly suited for handling high volumes of data which may, for example, be encountered when digitally processing a film. The image is typically a frame of a film and is divided into segments. The segments may each be handled by a dedicated processor. Typically this segment will consist of one or more lines of the image, the or each line preferably containing identification (control) information embedded at the start of each line. Thus, it is not necessary to employ a single processor capable of processing the complete image; rather a plurality of lower specification processors may be used.

Although the identifier may be stored in a separate data file, for example a look-up table, the identifier is preferably stored with the block of data. The identifier and the block of data may be stored in memory or written to a data storage device, such as a magnetic or optical medium. The method may further comprise the step of determining the amount of processing required on the data corresponding to different areas of the image. It may, for example, be determined that the data corresponding to one area of the image requires a particularly high level of processing. It may, therefore, be appropriate to vary the sizes of the segments of data depending on the amount of processing to be performed on the data corresponding to that part of the image. Thus, the segments of data may be smaller for areas where it is determined that a high level of processing is required. To determine the amount of processing required in particular areas, it is possible to perform a vertex count on the image. The segments may be sized such that each processor is responsible for processing substantially the same vertex count.

The methods described herein may also include the step of using the identifier to identify the block or blocks of data corresponding to a specified part of the image. Moreover, the method may further include the step of selecting data corresponding to that part of the image from the or each identified block of data. Thus, the identifier may be used to identify those blocks of data relevant to a particular area of the image and then specific data in those blocks may be accessed. The data may be accessed, for example, to perform a scaling operation on part of the image. Thus, a user may zoom into or out of a particular region of the image. In certain cases, it may be appropriate to perform the scaling operation relative to a point outside of the image. Of course, other operations may be performed, for example to vary the contrast or brightness of a particular area of the image. The part of the image to be accessed is typically specified by a user.

Of course, other data manipulation techniques are also envisaged. For example, the data may be modified to add a particular hue or tint to part or all of the image.

The blocks of data preferably each correspond to one or more lines of the image.

Viewed from a yet further aspect, the present application relates to a method of processing data corresponding to an image, the method comprising the step of dividing the data into segments, each segment corresponding to a part of said image; wherein the size of the segments of data are varied depending on the amount of processing to be performed on the data corresponding to that part of the image. The segments of data are preferably each processed by a separate, dedicated processor. Thus, the segments of data may be sized in relation to the processing capabilities of the processors. Again, typically these segments will consist of one or more lines of the image, each preferably with embedded identification (control) information at the start of each line. In this case, the number of lines per 'segment' can be adjusted to balance the computational load. One processor may handle a lower number of 'complex' lines (i.e. lines which require a relatively high level of processing) whereas another processor may handle a larger number of 'simpler' lines (i.e. lines which require a relatively low level of processing).

Viewed from a yet still further aspect, the present application relates to a system for processing data corresponding to an image, the system comprising means for dividing the data into a plurality of blocks; and at least one generator for generating an identifier to identify a region of the image to which each block of data relates.

Viewed from a further aspect, the present application relates to a system for processing data corresponding to an image, the system comprising a splitter for splitting the data into a plurality of segments, the segments each comprising a plurality of blocks of data; wherein each block of data corresponds to a region of the image and the system further comprises at least one generator for generating an identifier to identify a region of the image to which each block of data relates.

The systems described herein may further comprise means, such as a processor, for identifying the block or blocks of data corresponding to a selected part of the image.

The systems may also include a selector for selecting data corresponding to said part of the image from the or each identified block of data. Thus, only a selected portion of the data in each block of data may be accessed. Preferably, the system also includes a processor for processing the selected data to perform a scaling operation on the selected part of the image.

The system typically includes a user interface to facilitate selection of the part of the image by a user.

Viewed from a still further aspect, the present application relates to a system for processing data corresponding to an image, the system comprising a splitter for splitting the data into a plurality of segments, each segment corresponding to a part of said image; and means for determining the amount of processing to be performed on the data corresponding to different regions of the image; wherein the size of the segments of data is varied depending on the amount of processing to be performed on the data corresponding to that part of the image.

Viewed from a yet still further aspect, the present application relates to a method of processing data corresponding to an image, the method comprising the step of dividing the data into segments, each segment corresponding to a part of said image; wherein each segment of data is sized in relation to the amount of processing to be performed on the data corresponding to that part of the image.

Viewed from a further aspect, the present application relates to a method of processing data corresponding to an image, the method comprising the steps of: (a) reading the data; (b) generating an identifier for identifying a region of the image to which a block of said data relates; (c) storing the identifier and the associated block of data in a data store. The method may further comprise the steps of: (d) reading the block of data from said data store; and (e) manipulating said block of data. Moreover, the method may also include the step of displaying the image corresponding to said manipulated block of data. Step (b) and step (c) may be repeated for each region making up the image.

The methods described herein may include the additional step of removing the or each identifier from the stored data.

The image is preferably a frame of a film.

Preferred embodiments of the present invention will now be described by way of example only and with reference to the accompanying drawings.

BRIEF DESCRIPTION OF THE DRAWINGS

FIGS. 7a, 7b and 7c illustrate zoom operations performed in a multiple node system;

DETAILED DESCRIPTION OF PREFERRED EMBODIMENTS

Figure 5:
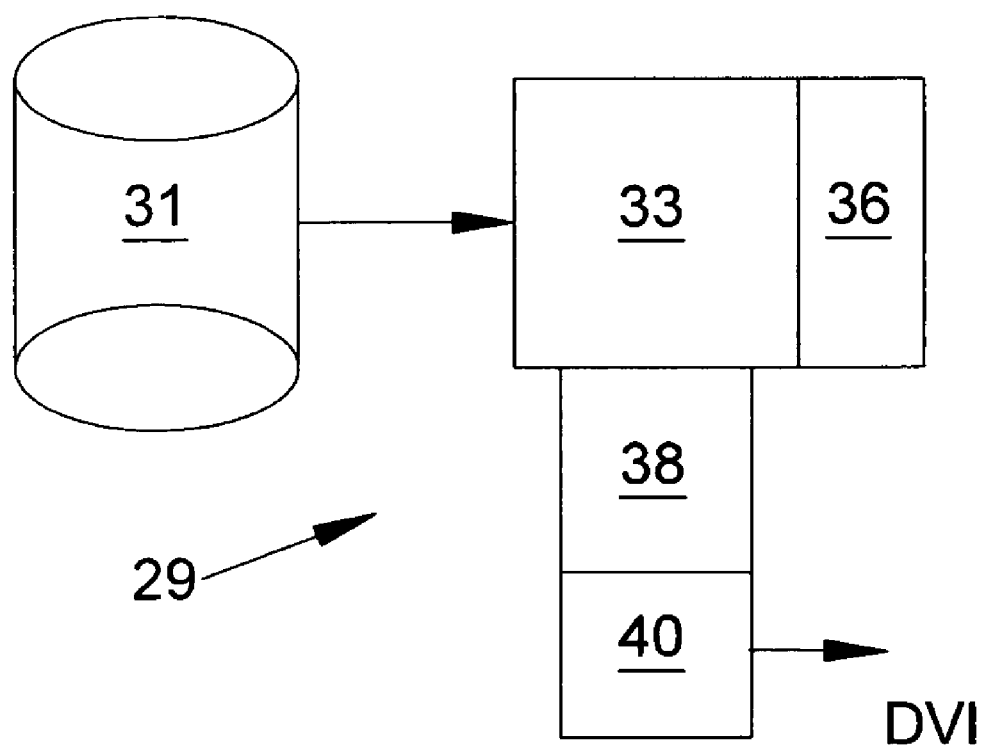
FIG. 5 shows schematically a system node for handling a portion of an image.

The methods according to he present invention may be employed in multiple node image processing systems, such as the systems marketed by the Applicant as Baselight 4 and Baselight 8. The purpose of multiple node systems is to allow each node to process a part (usually a stripe) of an image frame. By this technique, harnessing the power of multiple PC Processors and graphics cards, frames can be processed very quickly, as each node has only a portion of the total data to process. This can result in a considerable increase in speed compared with the conventional situation where processing of a whole frame is performed by only one computer. To assist in the understanding of the present invention, a single node 29 of a multiple node system will now be described with reference to FIG. 5.

The node 29 comprises a RAID disc system 31 for that node, a PC Processor 33, Random Access Memory (RAM) 36, which is also referred to as 'main' memory. In the PC backplane, there is an industry standard Graphics card 38, which in turn contains Video RAM (VRAM) 40. The VRAM on such cards contains many times more memory than the minimum amount of RAM needed to refresh the necessary part of the screen. Whilst it requires typically only 12.5 Megabytes to display a '2K' Digital Film Image, such cards typically contain 128 Mbytes or 256 Mbytes of memory. Thus it is possible to store many frames of image in the Video RAM on these cards.

The process for a standard image display in a multiple node image processing system involves several steps. Initially, an image is loaded into the system from an external source. Typically this external source is an image server or SAN (Storage Area Network). Images are loaded into the system via the host I/O computer. The host I/O computer then places the relevant image data—typically a stripe of image (usually containing slightly more image area than absolutely necessary) onto each of the RAID arrays for the relevant node in the system. Typically, these RAID arrays can be constructed from a 3ware RAID controller (made by 3ware of Sunnyvale, Calif., USA, connected to any number of SATA specification discs, such as those available from Western Digital, of Lake Forest, Calif., USA. Typically 3 Terabytes per node will be used. The corresponding part of the image data is then loaded from the RAID array to each PC's 'main' RAM memory.

The display of an image utilizing a multiple node system having four nodes will now be described by way of example. Each of the four nodes handles a quarter of the image in its PC State memory. Firstly a draw command is issued from the 'drawing engine' (implemented in our case as a software module running on each of the node PCs) via the Open GL industry standard language to draw the image at the requested size and co-ordinate space. The Open GL language has been in existence since 1992 and more information on this standard can be obtained from www.opengl.org. Each node outputs its data as industry standard Digital Video Image (DVI) data. In a normal (single node) implementation, which would not feature a combiner, this DVI would go out to the computer monitor for display. However, in the case of a multi PC system, the DVI output goes to combiner hardware. The combiner concatenates all the nodes data, as described in the Applicant's co-pending UK patent application GB 0414897.9 which is incorporated herein by reference. This combined data is fed to a computer monitor where the result of the composite nodes is displayed.

Operations of the first class of visual operations can then mathematically be carried out on the image, for example to lighten or darken the image. Typically, to accomplish this, the data will be read from RAM memory, processed through a look-up table, also stored in computer main memory, and written back to either another block of main memory, or possibly the same area of main memory. The advantage of writing back to a separate area of main memory is that this always facilitates an instant 'undo' feature, should either the command have been entered erroneously, or if the operator decides that the change was undesirable. This data is then written (via the manufacturer supplied Device driver for the graphics card) to the Graphics card via an OpenGL 'Draw' command.

The Graphics cards contain processing elements to perform, amongst other things, 'on the fly' resizing or zoom. These are controlled by the 'draw' commands. Only image processing functions of the second class (i.e. related to display functions) can be performed at this stage. With currently available graphics cards, these operations can take place easily within a frame rate. The video card stores the processed data in part of its Video RAM, and whilst this would normally be used to connect to an industry standard monitor, in the present case this DVI signal goes to the combiner unit as described in the Applicant's co-pending application (GB 0414897.9). In the case of the first class of processing (for example, the lightening or darkening of an image), if each node in a multi node system carries out an identical LUT function on each of the image or sections, then it will appear identical to performing this transformation on the whole image.

Figure 6B:
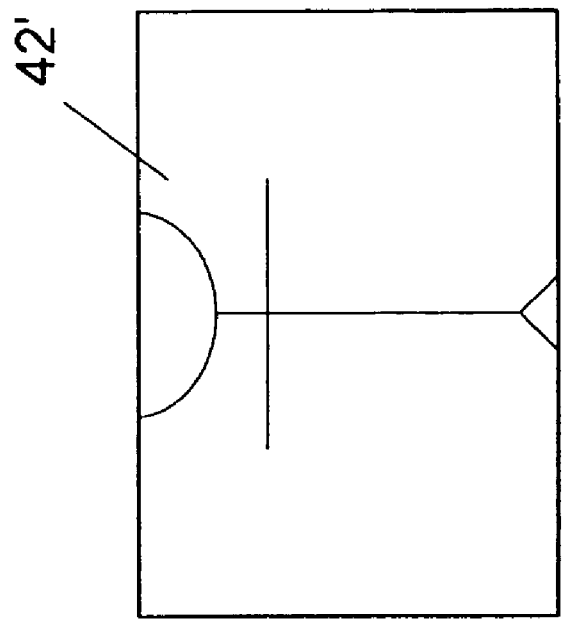
FIGS. 6a and 6b illustrate a zoom operation performed on a digital image.
Figure 6A:
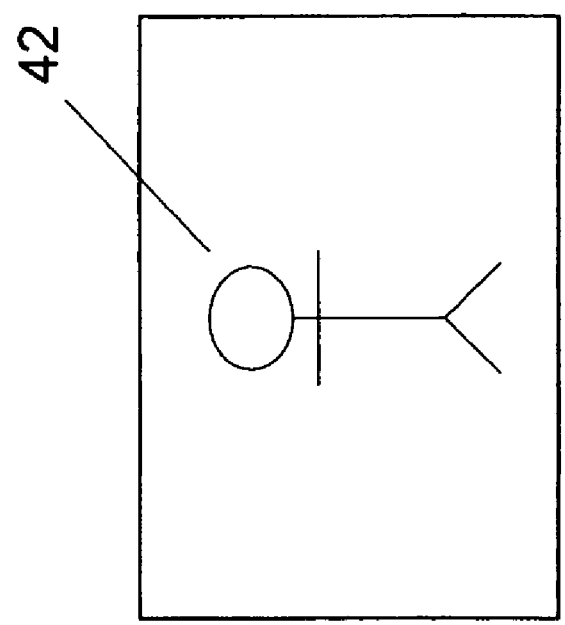

However, the same is not true with a display class operation such as resize. The expected resize of an image 42 to an enlarged image 42' is shown in FIGS. 6a and 6b. The situation is markedly different when the image 42 is divided into stripes 44, 46, 48, 50 to be processed by separate nodes, as shown in FIG. 7a. If the zoom operation is performed about the centre of each stripe of the image 42, the desired zoom operation is not achieved, as shown in FIG. 7b. Rather, each graphics card should be utilised to write to more (or less) then the default (¼) overall picture stripe to provide the desired enlarged image 42', as illustrated in FIG. 7c. This mode of utilisation, and how it is achieved, is one aspect of the present invention, and requires several steps to implement.

By way of example, the implementation of four types of display functions (i.e. the second class of operations—ones that do not affect the stored or film image) will now be described. As a first example, the implementation of the system to produce a display zoom will be described. As a second example, the implementation of the system to provide a 'one above the other' comparison with zoom will be described. The third example will show a zoom comparison with 'side by side' images; and the fourth will show zoom 'side by side' with a wipe.

Figures 8A, 8B:
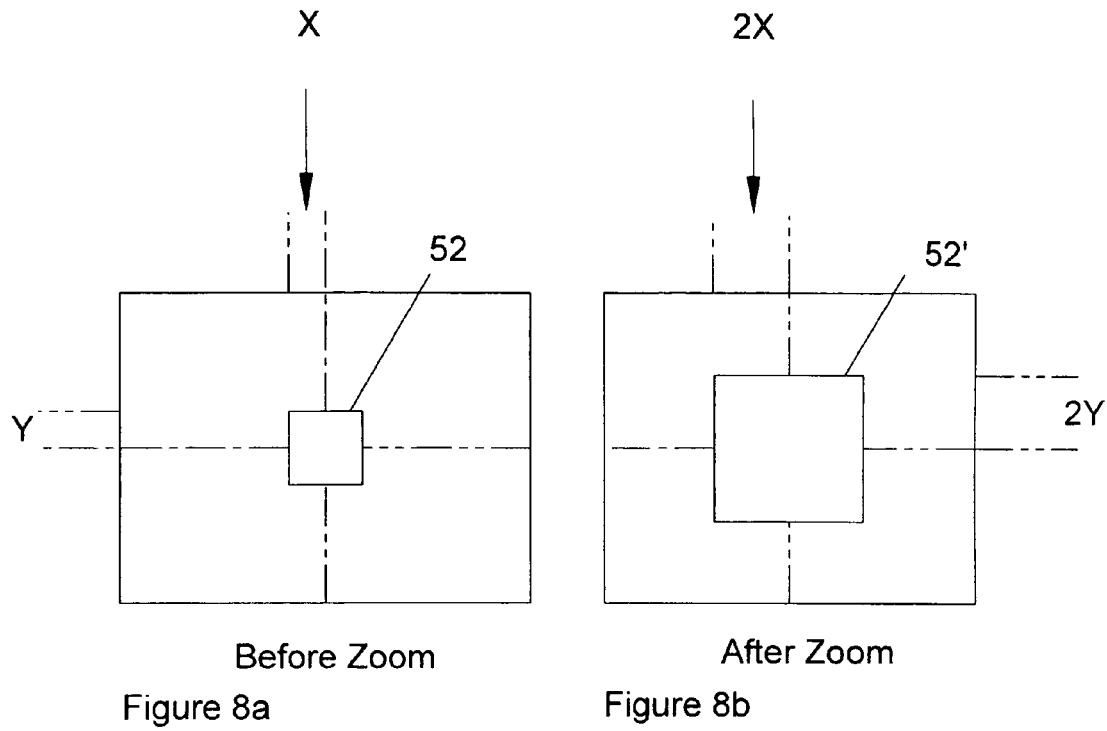
FIGS. 8a, 8b and 8c show the steps associated with performing a zoom operation.

In the first of the above cases, a zoom operation is to be performed on an image 52, which is illustrated in FIG. 8a as a rectangular box. An enlarged image 52' is shown in FIG. 8b. To accomplish this in the situation where the image is stored in stripes across multiple nodes, several steps are needed. Firstly it is necessary for the operator to specify that an operation is required, and how much to change the image by this operation. By way of example, the operator may specify that the operation is a zoom and that the factor is a 100% increase. This instruction is received through the operator interface, and stored in the host computer that is connected to this interface. This command is then passed to each node. Each node's drawing engine needs to calculate the new position and zoom factor for its own particular node. As shown in FIG. 8a, the image 52 must zoom relative to the centre of the displayed feature.

The mathematics for this zoom operation will now be described. A zoom around the picture centre is calculated for the desired zoom ratio. In the case of FIG. 8a, the zoom ration is 100%, and the image 52 grows around the centre.

Figure 8C:
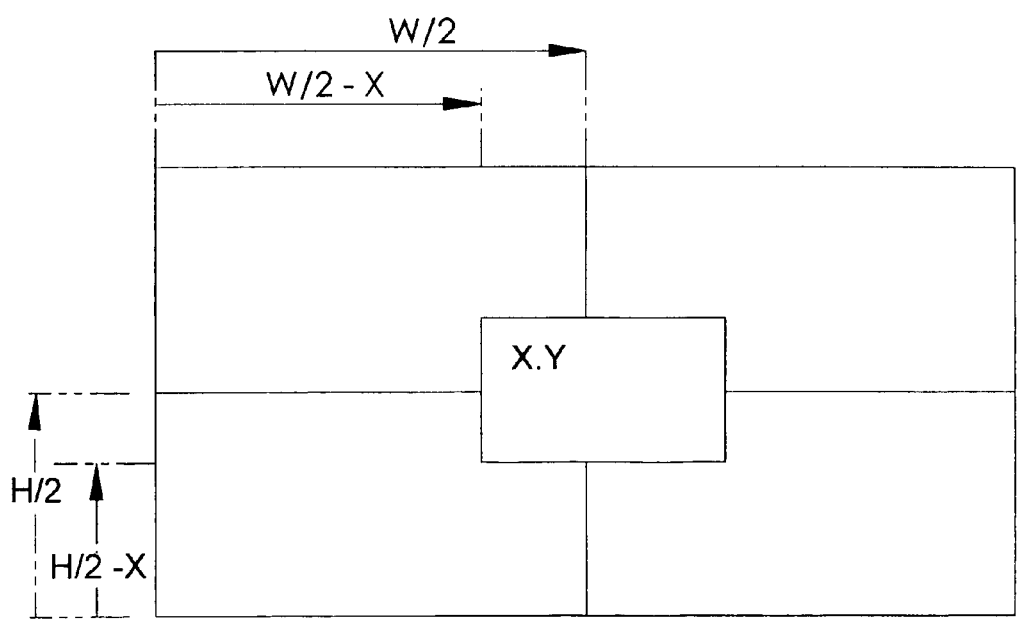

Assuming a picture width of W pixels, and a height of H pixels, the centre of the picture is at co-ordinates (W/2, H/2), as shown in FIG. 8c. This is the point about which the zoom is performed.

The left hand edge of the image 52 has its centre at (W/2−X, H/2). This pixel maps to address (W/2−ZX, H/2), Z being equal to the zoom factor.

The top left hand corner of the image 52, co-ordinates (W/2−X, H/2+Y), maps to (W/2−ZX, H/2+ZY)

A generic point in the image 52, of co-ordinate x',y' (as measured in the right hand and up direction from the centre of the box) maps to (W/2−x'Z, H/2+y'Z)

Note that the above assumes a symmetric zoom. By substitution of Z for Z1 (Horizontally) and Z2 (vertically) asymmetric zooms can be obtained These commands are then sent from the drawing engine as Open GL commands to the Graphics card device driver, causing the graphics card to write the appropriate number of lines and pixels of data into the DVI stream that goes to the combiner.

Figure 9:
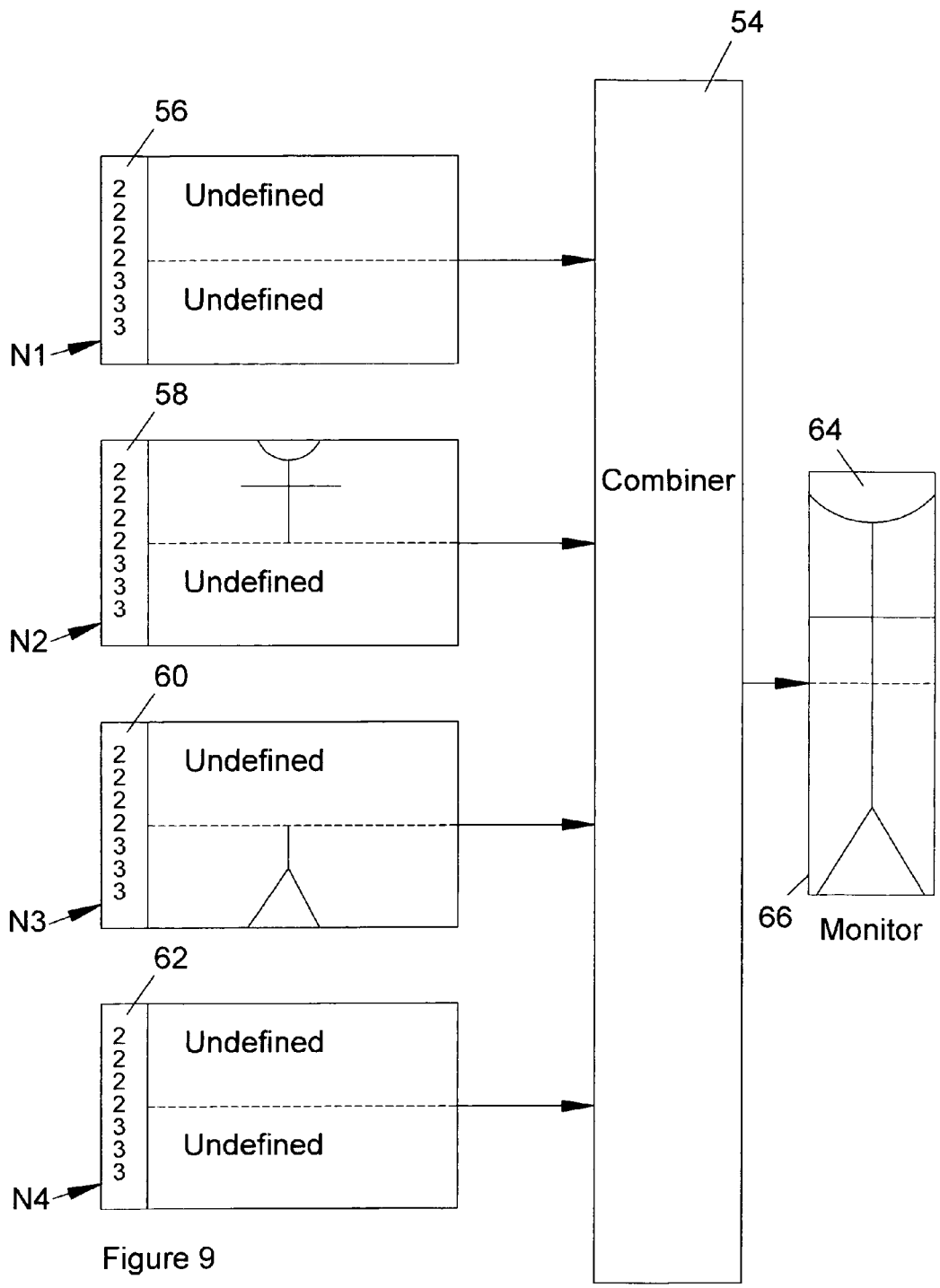
FIG. 9 shows schematically the insertion of line identifiers by each node in a multiple node system.

As illustrated in FIG. 9, the present architecture requires that a combiner 54 knows what data is to be used to assemble the final image for display. To accomplish this, an identifier is added to tag the data and to provide the required instructions to the combiner. The commands of a drawing engine set the data value in the first pixel at the start of each line with a value to indicate which node it originates from. As an example, it is possible to use one byte to indicate which of up to 256 nodes a line of data comes from. When line data is received by the combiner, it can calculate which lines of which node are necessary to produce the required composite display.

In the present example, more lines are required from certain nodes than others. In practice, it does not matter that the first pixel of each line is effectively removed from the image stream, as being an operation that affects only the image displayed it does not affect the eventual output image in any way. This effective removal of the first pixel of each line is not noticed by the operator anyway, as it represents such a small change in the line length.

The combiner 54 has passed to it the drawing geometry, to allow it to determine which lines are required to form the composite image. The combiner can identify the lines it wants, and can effectively produce a composite image that represents a zoom. As an additional feature, the combiner 54 can set the initial value of each line to be zero (i.e. fully 'dark') before display. This means that the displayed picture does not contain spurious values in the first column which may be visually distracting. A further addition here is to configure the frame store of the Graphics card to be larger than the display line length. For example, if it is desired to display lines of 2048 pixels, the effective line can be configures to have a length of 2049 pixels (using software commands available from the vendor of the graphics cards), giving one pixel for the identifier codes. The display combiner is instructed only to take the relevant 2048 pixels per line as 'display' pixels, stripping the control pixel off.

Whilst it is possible for one designated node only to insert the line-use identifier codes at the start of its lines, in practice, it is generally simpler if all nodes are programmed to insert the identifier code. As shown in FIG. 9, each of four nodes N1, N2, N3. N4 contain start-of-line identifier codes 56, 58, 60, 62 to achieve the desired display from the combiner 54. Each node N1, N2, N3, N4 passes the overall line assembly information to the combiner 54 to display an image 64 on a monitor 66.

Figure 10:
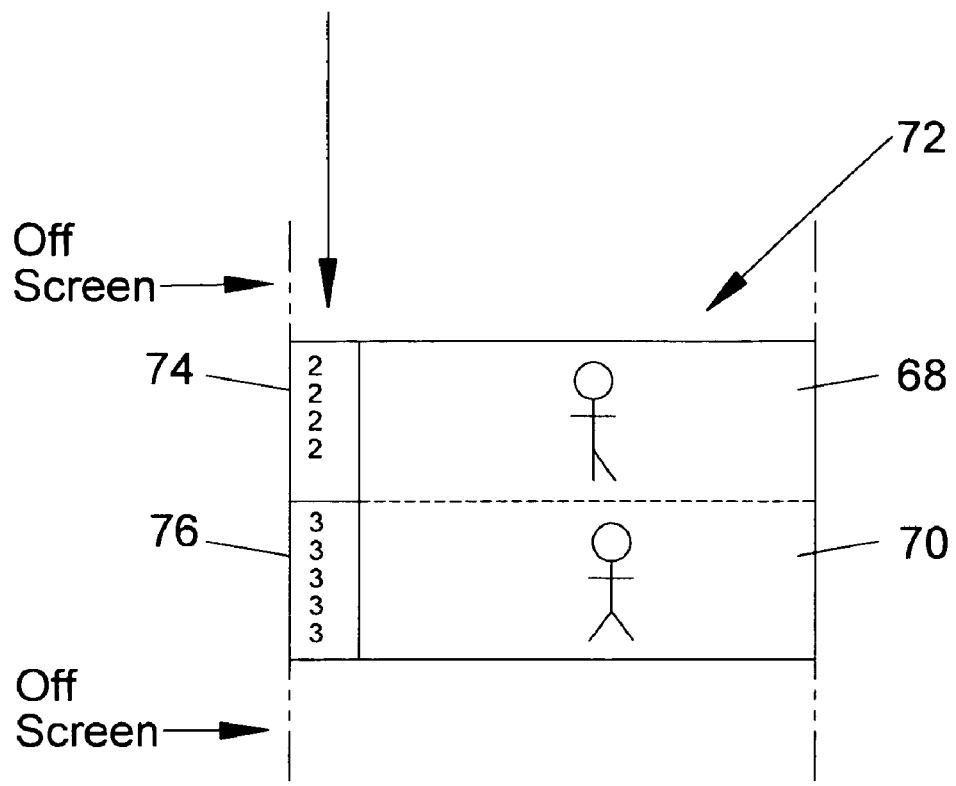
FIG. 10 illustrates the use of identifiers to display first and second images one above the other.

Considering the second example display function, where two different images 68, 70 are to be displayed one above the other to form a composite image 72. To accomplish this, the same drawing engine as described above is employed, but since the operator has specified at the user interface that he wishes to see the two images 68, 70 one above the other the drawing engine produces appropriate line-use identifier codes 74, 76, as shown in FIG. 10. When the combiner 54 receives the data from each node N1, N2, N3, N4, the line-use identifier codes 74, 76 instruct the combiner which lines to use in the composite image 72, and which to discard.

Figure 11:
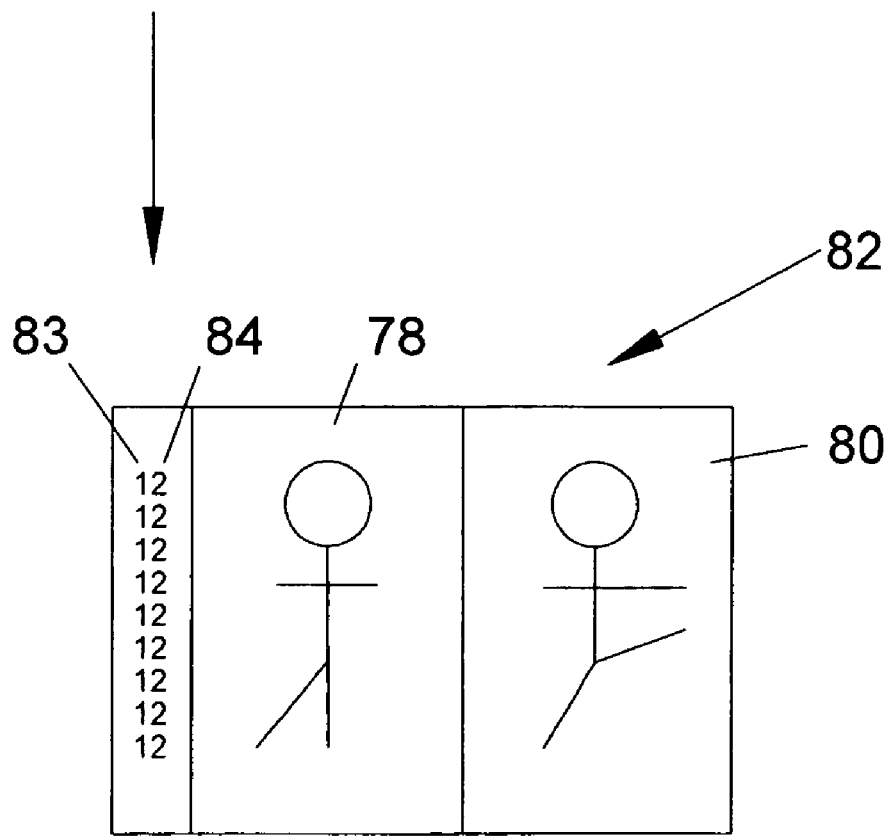
FIG. 11 illustrates the use of identifiers to display first and second images side-by-side.

For the third example of display function, two different images 78, 80 are to be displayed side-by-side to form a composite image 82. So far, only complete lines have been tagged with identifier codes, but the same principle can be used to indicate to the combiner 54 whether which part of a line is to be used, for example the left half or the right half of the line. Codes that can do this may be implemented in the same way as whole lines except that the upper 4 bits of the control byte are used to provide the source information for the left hand side of the picture, and the lower 4 bits of the control byte to provide source information for the right hand side of the picture. FIG. 11 shows the use of identifier codes 83, 84 in this mode to control the display of two images in the side-by-side mode. With four bits it is still possible to denominate between sixteen source nodes. Obviously, by increasing the size of the control information any number of source nodes can be accommodated.

Figure 12:
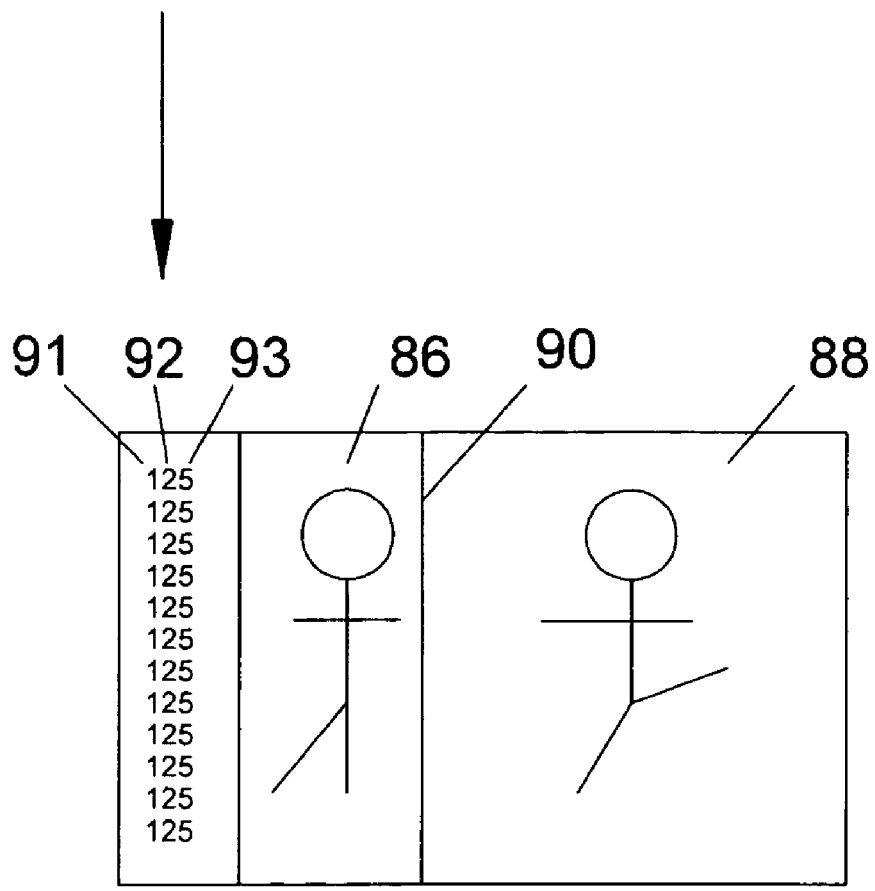
FIG. 12 illustrates the use of identifiers to display first and second images side-by-side with a variable transition point.

However, the system described with reference to FIG. 11 can only display two fixed halves of the screen. It is desirable to be able to generalise on this to display two (or more) source images 86, 88 side by side, with a boundary 90 not necessarily half way across the screen. This can be accomplished in a further extension of this idea to use three codes 91, 92, 93. The first code 91 indicates the source of the first image in those lines (i.e. left hand side); the second code 92 defines the transition point between first and second images 86, 88 along that line; and the third code 93 defines the content of the second half of the line. This is illustrated in FIG. 12.

This can be logically extended to the case where it is desired to display N images side-by-side. In this case, the first code will contain the source node number of the first part of the line. The second contains the first transition point address along the line, and subsequent codes contain the source node number and transition points for subsequent images.

The implementation of a wipe function, where it is possible to wipe between two images displayed side-by-side, will now be described. In the present case, a vertical wipe division is to be provided. To achieve this, the general scheme described above for displaying images side-by-side will be employed. Using the 'three code' scheme, the drawing engine may dynamically alter the transition point in response to commands from the operator, received through the user interface and passed to the nodes.

Thus a generalised architecture for displaying user defined 'mosaics' of multiple images to assist the operator in digital film post production has been developed. This scheme and methodology can be extended to cover diagonal wipes where the transition point along each line is at a different point. It could be further extended to cover wipes that were not themselves straight lines. The wipe could be circular, although this obviously requires a coding scheme that allows more than one transition point per line.

Figure 1:
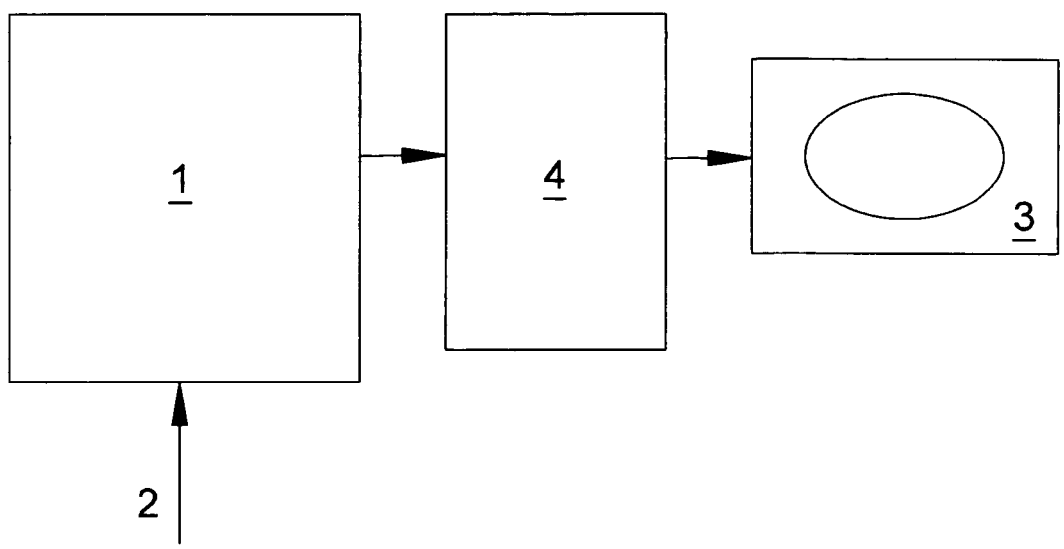
FIG. 1 shows schematically a known system for storing digital images.
Figure 2:
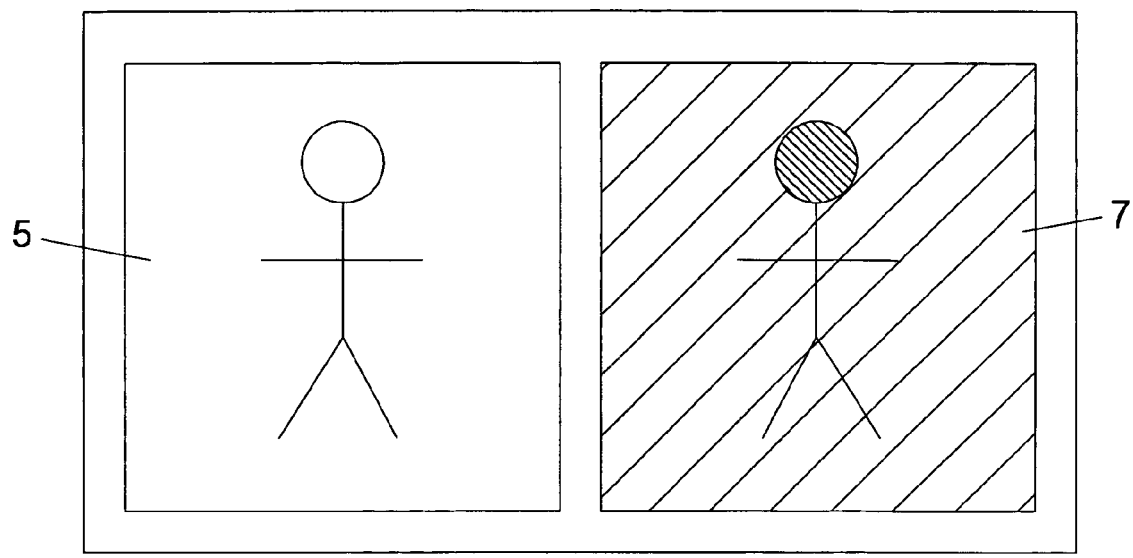
FIG. 2 shows first and second images displayed side-by-side.
Figure 3:
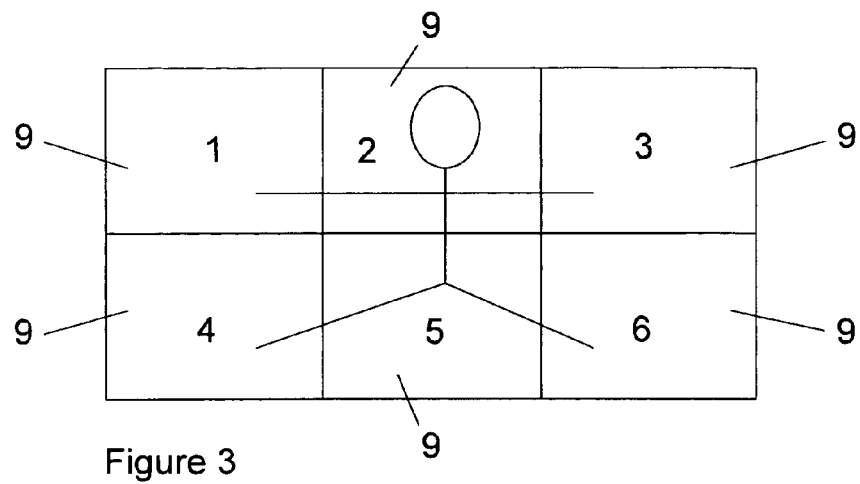
FIG. 3 shows a video wall made up of six screens arranged in two rows of three.
Figure 4:
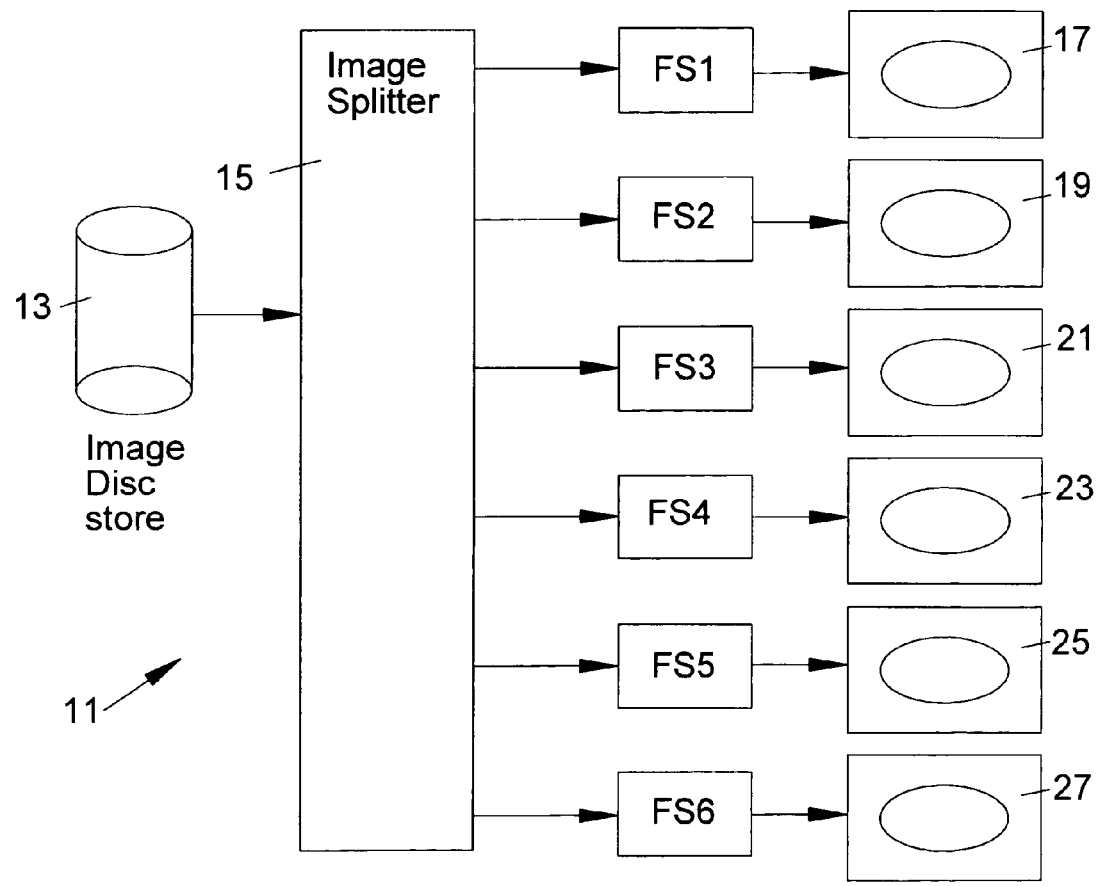
FIG. 4 shows schematically the system for supplying images to the screens of the video wall shown in FIG. 3.
Figure 13:
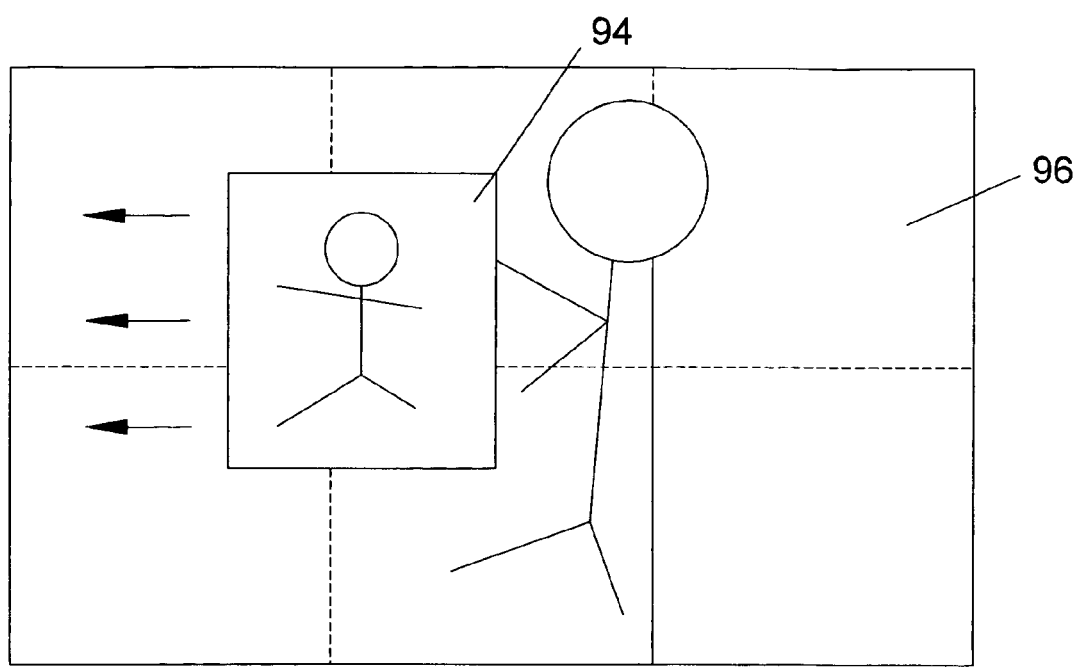
FIG. 13 illustrates a composite image with a moving image superimposed on the composite image.

The above principles will now be applied to other similar classes of problems. One such problem, referred to earlier, is the Video Wall. FIG. 4 illustrated how this could be implemented using multiple frame stores and multiple display devices. Now in the digital film post production examples given above, the processes described to combine multiple image streams into one stream may be implemented. In the video wall application one video signal is to be split into a plurality of streams for individual display. However, the same advantages still apply for inserting an identifier code to tag the image data. Consider the example of producing a video wall display consisting of a small image 94 of one source content that is dynamically floated over another image 96 stream that fills the display, as illustrated in FIG. 13. Inserting identifiers to tag the smaller image element line segments according to the system described earlier, and also inserting identifiers to tag the individual elements that are used to compose the background (full) image on the video wall, a composite image can be created according to the operator's desire. The varying of the parameters over time will cause the smaller image to move in the direction desired. The advantage of using this tagging technique is that an overall frame store is not required for the floating image.

A description of the system to implement this process will now be described. The images are initially stored on the image server disc. The background image 96 is partitioned into tiles (using the techniques described herein). An identifier code is inserted at the start of each line of the image 96 to tag each file with a reference number. The identifier code will be used later to float the smaller image 94 over the background image. Each tile is loaded into its relevant display system, which will often be an Industry standard PC, with an Industry standard graphics card installed in it. Each graphics card will drive the relevant display device, in circumstances where the display devices are arranged in an adjacent pattern to form one large image display.

Considering the process of introducing the second, smaller image, a general purpose PC calculates the co-ordinates in the 'large picture space' in which the smaller image 94 is to be displayed. The relevant image segments are supplied to each display subsystem, and these image segments are tagged with the necessary identifying data. As was illustrated earlier in the single display space (digital film post production) system, scroll images and/or wipes can be performed by manipulating the image identifier data. Thus by the relevant calculations on a general purpose PC, the second image can be floated in any direction (diagonal directions can be achieved by using the appropriate combination of vertical and horizontal) and at any speed (speed is controlled by the distance moved between two adjacent frames) over the background image.

Whilst the example above, of one background image filling the whole video wall, and one smaller image floating over this is rather trivial, it does illustrate the mechanisms possible with preferred embodiments of the present invention. By the appropriate use of multiple image features, together with the use of irregular images (as described earlier) an overall 'drawing language' has been developed for images that may consist of single streams with single displays, multiple streams with single displays, single streams with multiple displays, and multiple streams for multiple displays. All combinations desired can be described by the use of the 'image tagging' methods above.

In a further implementation of the Digital Film Post production system described earlier, the application of computer processor (or graphics card) power can be varied by altering the amount of picture that is processed by each computer and graphics card sub-system. The system described above relied on four computers, each processing one quarter of the overall image. However, in certain circumstances, it will be desirable to divide the image into segments depending on the required level of computational processing required, rather than in terms of picture elements to be processed.

Figure 14A:
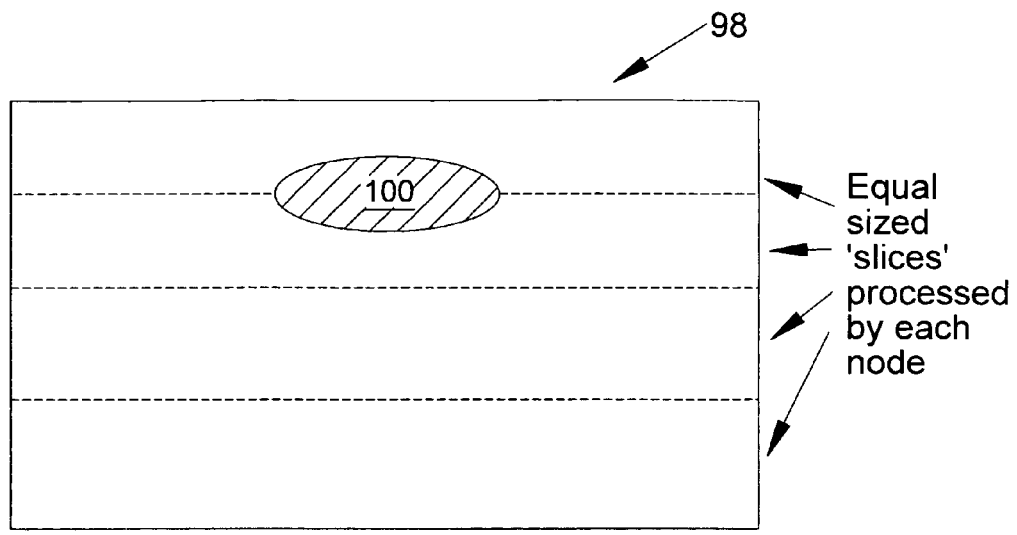
FIGS. 14a and 14b illustrate the division of an image into segments of varying size in response to differing computational requirements across the image.
Figure 14B:
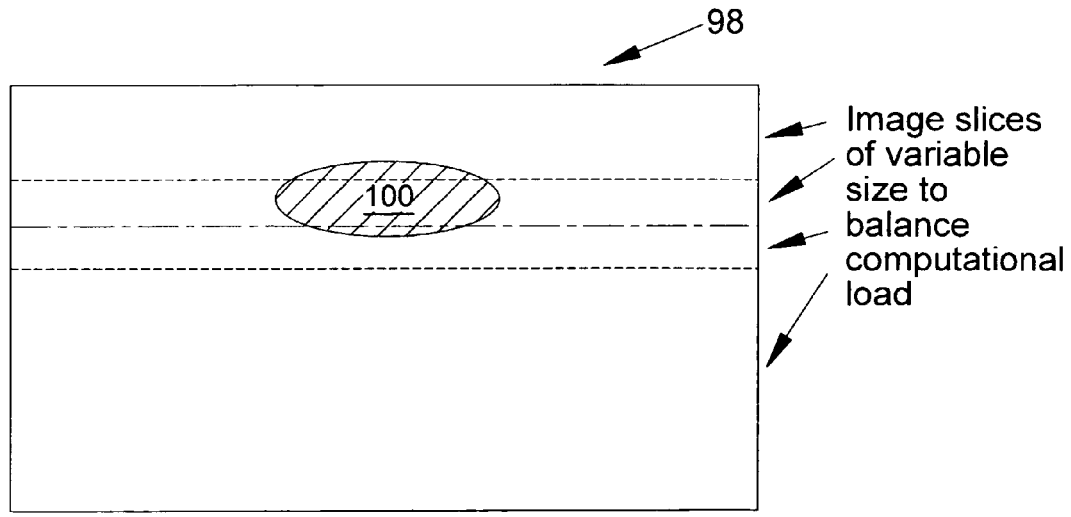

By way of example, consider an image 98 of the type shown in FIGS. 14*a* and 14*b*. It is desired to carry out particularly complex calculations on a small part 100 of the image, whilst the remainder of the image requires only a simple level of processing. A metric is required to be able to allocate pixels per processor. One method is to carry out a vertex count (using, for example, vertex counting subroutines supplied by Macromedia Corporation or Alias.) and vary the size of each of the segments to be supplied to each of the processors depending on the level of processing required. Thus, the vertex count may be maintained approximately equal in each slice. This method can of course optimally be altered between frames, to ensure that each frame is correctly 'load balanced'. By the use of this feature, substantially greater productivity can be obtained with a given number of nodes, and functions that would not be possible to carry out in real time with an 'equal' split between nodes now become executable in real time.

While the invention has been shown and described with reference to particular embodiments thereof, it will be understood by those skilled in the art that the foregoing and other changes in form and detail may be made therein without departing from the spirit and scope of the invention.

The invention claimed is:

1. A method of operating a multiple node image processing system to process data corresponding to an image, the method comprising the steps of:
   (a) generating an identifier for identifying a region of the image to which a block of said data relates;
   (b) storing said identifier;
   (c) repeating steps (a) and (b) for a plurality of blocks of said data; and
   (d) operating a combiner to assemble a final image for display, wherein the identifier is added to tag each block of data and to provide the combiner with instructions as to which blocks of data are to be used to assemble the final image.

2. The method as claimed in claim 1, wherein the identifier identifies the vertical position of the region of said image to which the block of data relates.

3. The method as claimed in claim 1, wherein the identifier identifies the horizontal position of the region of said image to which the block of data relates.

4. The method as claimed in claim 1, wherein the identifier identifies the transition from said image to a separate image.

5. The method as claimed in claim 1, wherein the block of data corresponds to a line of the image.

6. The method as claimed in claim 1, wherein the block of data corresponds to a part of a line of the image.

7. The method as claimed in claim 1, wherein the identifier is stored by writing the identifier to said block of data.

8. The method as claimed in claim 7, wherein the identifier overwrites data corresponding to one or more pixels of the image.

9. The method as claimed in claim 8, wherein the said one or more pixels are located at an edge of the image.

10. The method as claimed in claim 8 further comprising the step of re-setting the identifier to a predetermined value prior to displaying the image.

11. The method as claimed in claim 1, wherein the identifier is stored with said block of data.

12. The method as claimed in claim 11, wherein the identifier and said block of data are written to a data storage device.

13. The method as claimed in claim 1, wherein the image forms part of a composite image.

14. The method as claimed in claim 13, wherein the process is repeated for each image forming the composite image.

15. The method as claimed in claim 14, wherein the processing of each image forming the composite image is handled by a dedicated processor.

16. The method as claimed in claim 11, wherein the composite image is a frame of a film.

17. The method as claimed in claim 1 further comprising the step of using the identifier to identify the block or blocks of data corresponding to a part of the image.

18. The method as claimed in claim 17 further comprising the step of selecting data corresponding to said part of the image from the or each identified block of data.

19. The method as claimed in claim 17, wherein the data is selected to perform a scaling operation on said part of the image.

20. The method as claimed in claim 19, wherein the scaling operation is performed relative to a point outside of the image.

21. The method as claimed in claim 17, wherein the part of the image is defined by a user.

22. A method of operating a multiple node image processing system to process data corresponding to an image, the method comprising:
   (a) processing a block of said data and generating an identifier for identifying a region of the image to which the data block relates;
   (b) repeating step (a) for a plurality of blocks of said data; and (c) operating a combiner to assemble a final image for display, wherein the identifier is added to tag each block of data and to provide the combiner with instructions as to which blocks of data are to be used to assemble the final image.

23. The method as claimed in claim 22 further comprising writing the identifier and said data block to a data storage device.

24. The method as claimed in claim 22 further comprising the step of selecting and displaying only data relating to said image.

25. A method of operating a multiple node image processing system to process data corresponding to an image, the method comprising the steps of:
   (a) dividing the data into segments, each segment corresponding to a part of said image;
   (b) subdividing the segments of data into a plurality of blocks of data;
   (c) generating an identifier for identifying a region of the image to which each block of data relates; and
   (d) operating a combiner to assemble a final image for display, wherein the identifier is added to tag each block of data and to provide the combiner with instructions as to which blocks of data are to be used to assemble the final image.

26. The method as claimed in claim 25 further comprising the step of writing the identifier and the data block to a data storage device.

27. A method as claimed in claim 25, wherein the size of the segments of data are varied depending on the amount of processing to be performed on the data corresponding to that part of the image.

28. The method as claimed in claim 25, wherein said segments of data are each processed by a dedicated processor.

29. The method as claimed in claim 25, wherein the image is a frame of a film.

30. The method as claimed in claim 25 further comprising the step of using the identifiers to identify the block or blocks of data corresponding to a part of the image.

31. The method as claimed in claim 30 further comprising the step of selecting data corresponding to said part of the image from the or each identified block of data.

32. The method as claimed in claim 30, wherein the data is selected to perform a scaling operation on said part of the image.

33. The method as claimed in claim 30, wherein the part of the image is defined by a user.

34. A multiple node system for processing data corresponding to an image, the system comprising means for dividing the data into a plurality of blocks;
   a combiner for assembling a final image for display; and
   at least one generator for generating an identifier to identify a region of the image to which each block of data relates and to tag each block of data and to provide the combiner with instructions as to which blocks of data are to be used to assemble the final image.

35. The system as claimed in claim 34 further comprising means for identifying the block or blocks of data corresponding to a part of the image.

36. A multiple node system for processing data corresponding to an image, the system comprising a splitter for splitting the data into a plurality of segments, the segments each comprising a plurality of blocks of data;
   wherein each block of data corresponds to a region of the image and the system further comprises a combiner for assembling a final image for display; and
   at least one generator for generating an identifier to identify a region of the image to which each block of data relates and to tag each block of data and to provide the combiner with instructions as to which blocks of data are to be used to assemble the final image.

37. The system as claimed in claim 36 further comprising means for identifying the block or blocks of data corresponding to a part of the image.

38. The system as claimed in claim 37 further comprising a selector for selecting data corresponding to said part of the image from the or each identified block of data.

39. The system as claimed in claim 38 further comprising a processor for processing the selected data to perform a scaling operation on the part of the image.

40. The system as claimed in claim 37 further comprising a user interface to facilitate selection of said part of the image by a user.

41. The system as claimed in claim 36, wherein the image is a frame of a film.

42. A method of operating a multiple node image processing system to process data corresponding to an image, the method comprising the steps of:
   (a) reading the data;
   (b) generating an identifier for identifying a region of the image to which a block of said data relates;
   (c) storing the identifier and the associated block of data in a data store;
   (d) repeating steps (b) and (c) for each region making up the image; and
   (e) operating a combiner to assemble a final image for display, wherein the identifier is added to tag each block of data and to provide the combiner with instructions as to which blocks of data are to be used to assemble the final image.

43. The method as claimed in claim 42 further comprising the steps of:
   (f) reading the block of data from said data store;
   (g) manipulating said block of data.

44. The method as claimed in claim 43 further comprising the step of displaying the image corresponding to said manipulated block of data.

45. The method as claimed in claim 42 further comprising the step of removing the or each identifier.

* * * * *